(12) United States Patent
Darack et al.

(10) Patent No.: US 6,747,956 B1
(45) Date of Patent: Jun. 8, 2004

(54) METHOD FOR MEASUREMENT OF RECEIVE ANTENNA RETURN LOSS IN A CDMA RADIO SYSTEM

(75) Inventors: Sheldon B. Darack, Livingston, NJ (US); Stephen D. Kitko, Newton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/364,295

(22) Filed: Jul. 30, 1999

(51) Int. Cl.[7] ............................................. G01R 31/08
(52) U.S. Cl. ...................................... 370/252; 370/241
(58) Field of Search ................................. 370/241, 252, 370/248, 250, 310, 320, 321, 335; 455/422, 423, 424, 522, 67.1, 115, 91, 67.4

(56) References Cited

U.S. PATENT DOCUMENTS

| | | | | |
|---|---|---|---|---|
| 5,425,076 A | * | 6/1995 | Knippppelmier | ............. 379/27 |
| 5,471,146 A | * | 11/1995 | Krayeski | ................... 455/115 |
| 5,946,606 A | * | 8/1999 | Shimizu | ................... 455/67.1 |
| 6,289,216 B1 | * | 9/2001 | Koh | .......................... 455/424 |
| 6,313,644 B1 | * | 11/2001 | Kim | ........................... 324/645 |

* cited by examiner

*Primary Examiner*—Kenneth Vanderpuye
*Assistant Examiner*—Ricardo M. Pizarro

(57) ABSTRACT

The diagnostic test uses the effects of closed loop power control in order to measure the return loss of a receive antenna in a CDMA radio system. A standard CDMA call is established under closed loop power control by a mobile in a test unit. Using a switch matrix, the call is directed on the incident path of a receiving antenna. After a stabilization interval, the mobile phone in the test unit is queried for its transmit power level. The established call is then directed on the reflected path of the receiving antenna. After a stabilization interval, the mobile phone is again queried for its transmit power level. The difference between the previous incident transmit power level and the new increased transmit power level is the return loss of the antenna.

9 Claims, 2 Drawing Sheets

METHOD FOR MEASUREMENT OF RECEIVE ANTENNA RETURN LOSS IN A CDMA RADIO SYSTEM

BACKGROUND OF THE INVENTION

1. Field of the Invention

The present invention relates generally to operational maintenance surveillance of telecommunications equipment. More particularly, the present invention relates to a method and apparatus for measuring receive antenna return loss in a CDMA (Code Division Multiple Access) radio system.

2. Description of Related Art

Telecommunications equipment traditionally has been offered with a significant number of features allowing on-line system test and operational maintenance surveillance. These features allow economical system OA&M (Operation, Administration and Maintenance) since routine system testing and monitoring can be automatically performed and service provider technical staff can be relieved of these tasks.

After initial installation of a telecommunications system, determining the integrity of a base station antenna is an important concern. The Receive Antenna Return Loss test is a diagnostic measurement routinely automated with analog cellular base station products, which provides a reasonable verification of sustained antenna integrity. This test quantifies the reflection characteristics of an antenna in order to detect whether the antenna is functioning within desired parameters. The ratio of RF (Radio Frequency) power reflected from the antenna to the RF power applied to the antenna defines the reflection coefficient of the antenna. A reflection coefficient having a value close to zero (0) indicates that very little RF power is reflected and that the antenna is functioning properly. A reflection coefficient having a value close to one (1) indicates that most of the RF power is reflected and that the antenna is transmitting virtually zero RF power. Transmission of very low RF power indicates problems with the antenna.

Return loss is the magnitude part of the reflection coefficient expressed in decibels (dB). That is, return loss measures the magnitude of a reflected RF signal relative to the original incident RF signal. Return loss is typically referred to in terms of dBs of loss. As such, a large return loss value indicates very little reflection. For example, a return loss of 40 dB indicates very little reflection, while a return loss of 0 dB indicates complete reflection.

In analog systems, the Receive Antenna Return Loss test is performed by applying a signal from a RTU (Radio Test Unit) in the mobile receive band and monitoring the signal of a selected receive radio that is assigned to the selected channel frequency. A directional coupler is used to allow measurement of signal energy in both the forward direction and reverse direction, and a switch matrix, that is program controlled, selects the desired direction. The power difference between the forward and reverse signal levels is a measure of the return loss or impedance match accuracy of the antenna system. The forward and reverse signal levels are measured by querying the selected receive radio for its RSSI (Receive Signal Strength Indicator) output.

For a call in a CDMA system, a CDMA call, a unique code is assigned to all speech bits, and signals for all calls are spread across a broad frequency spectrum. The dispersed signals are pulled out by a receiver which knows the code for the call it must handle. This technique allows numerous phone calls to be simultaneously transmitted at one radio frequency. However, because all channels on a given carrier occupy the same frequency, a unique RSSI for one given channel is not available. As such, the conventional return loss test cannot be performed. Incremental RSSI measurements may be possible, but are confounded by the fact that typical CDMA signals are well below even the thermal noise level in most circumstances. Therefore, incremental RSSI measurements are extremely difficult and impractical.

Further, CDMA systems use closed loop mobile transmit RF power control. Achieving a known and stable RF level on a channel would violate such closed-loop power control and could confound other calls in progress on the system. Such approach would also require customized firmware and equipment for implementation.

Therefore, there is a need for an economical and practical method for measuring return loss of a receive antenna in a CDMA radio system.

SUMMARY OF THE INVENTION

The present invention uses the effects of closed loop power control in order to measure the return loss of a receive antenna in a CDMA radio system. A standard CDMA all is established under closed loop power control by a mobile phone in a test unit. Using a switch matrix, the call is directed on the incident path of a receiving antenna. After a stabilization interval, the mobile phone in the test unit is queried for its transmit power level. The established call is then directed on the reflected path of the receiving antenna. After a stabilization interval, the mobile phone is again queried for its transmit power level. The difference in dB between the reflected path transmit power level and the previous incident transmit power level, i.e., the reference transmit level taken when the call was set up, is the return loss of the antenna.

DETAILED DESCRIPTION OF THE INVENTION

Figure 1:
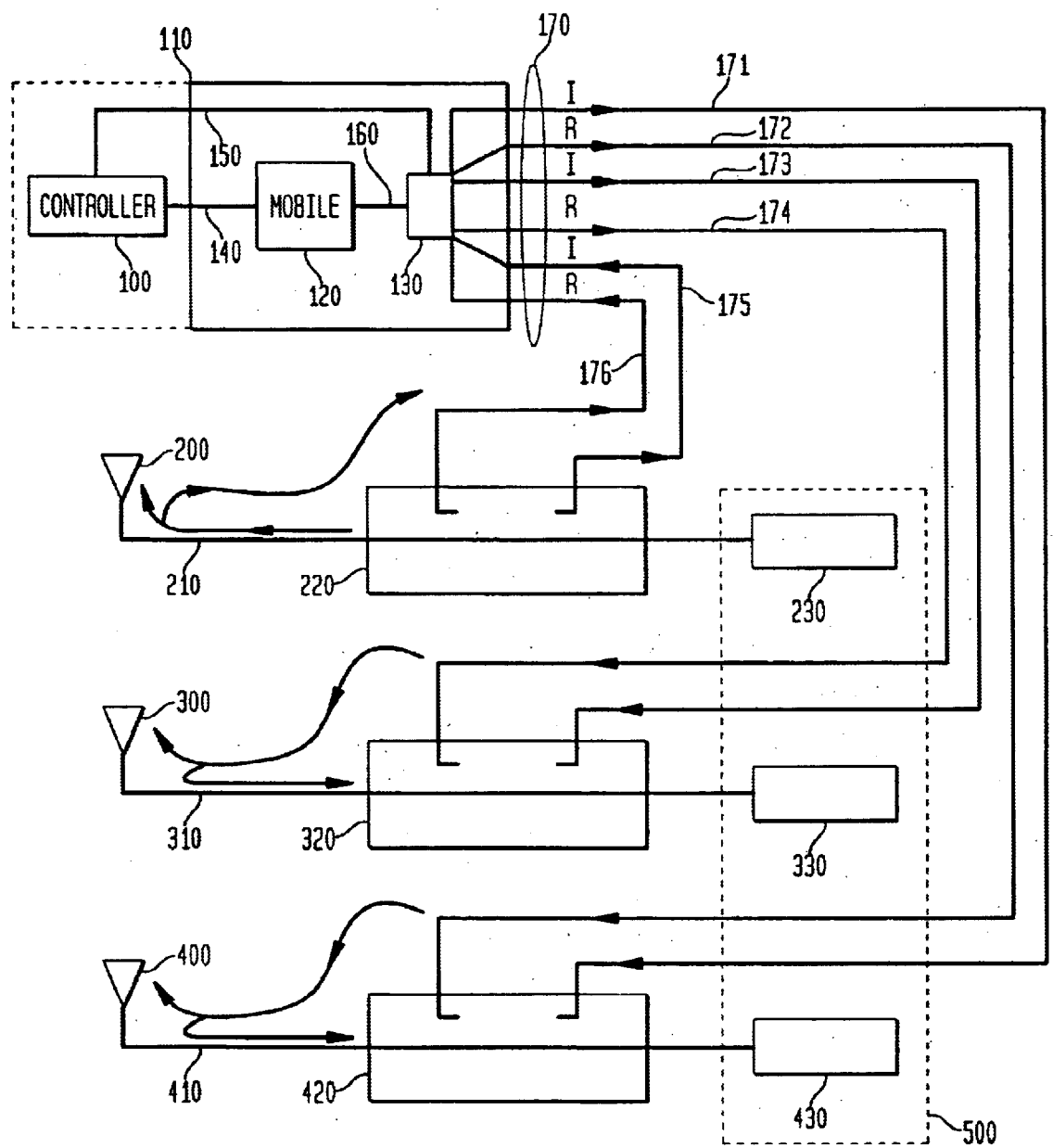
FIG. 1 illustrates an electrical block diagram of one embodiment of the present invention.

FIG. 1 illustrates one embodiment of the present invention. In this embodiment, a controller 100 commands a test unit 110 to perform a diagnostic return loss test. Examples of a test unit 110 which can be employed according to the present invention are the CRTU (CDMA Ratio Test Unit) and the CTRM (CDMA Test Radio Module) designed and manufactured by Lucent Technologies. The test unit 110 includes a mobile 120 and a switch matrix 130, which respond to commands of the controller 100 communicated over a first data channel 140 and a second data channel 150, respectively. The data channels 140, 150 may include one or more serial bus connections, RF channels or any other data path capable of communicating commands to the mobile 120 and switch matrix 130. The data channels 140, 150 may unidirectional or bi-directional.

The mobile 120 transmits and receives RF signals over a RF path 160 in response to commands of the controller 100. The RF path 160 may include one or more channels and may carry duplexed, unduplexed or any other type of RF signals.

The switch matrix 130 functions to control the direction of RF signals on the RF path 160 to and from other parts of the cell system in response to commands of the controller 100. The switch matrix 130 may be any system of switches (not shown) capable of simultaneously directing transmit and receive RF signals to and from the mobile 120. The system of switches of the switch matrix 130 open and close in response to commands from the controller 100 to direct RF signals over selected channels or paths 170.

In the embodiment shown in FIG. 1, the controller 100 commands a test unit 110 to perform the diagnostic return loss test in a simplex cell. A simplex cell system includes one transmit antenna 200, a first receive antenna 300 and a second receive antenna 400.

The first and second receive antennas 300, 400 may be diversity antennas, for example, such as a diversity 1 receive antenna and a diversity 0 receive antenna. The transmit antenna 200 is connected via first communication channel 210 through a first coupler 220 to a transmitter 230 in a base station 500. The first receive antenna 300 is connected via second communication channel 310 through a second coupler 320 to a first receiver 330 in the base station 500. The second receive antenna 400 is connected via third communication channel 410 through a third coupler 420 to a second receiver 430 in the base station 500.

As would be understood to those skilled in the art, the transmitter 230, the first receiver 330 and the second receiver 430 include all components necessary to transmit and receive RF signals.

The transmitter 230, the first receiver 330 and the second receiver 430 may be controlled so as to communicate with each other, evaluate transmitted and received signals, and send and receive information in response to transmitted and received RF signals, as described herein.

As shown, the switch matrix 130 enables RF communication between the mobile 120 and each of the transmit antenna 200, the first receive antenna 300, the second receive antenna 400, the transmitter 230, the first receiver 330 and the second receiver 430 via the first, second and third couplers 220, 320, and 430. In the first coupler 220, the L-shaped portion closest to the transmitter 230 directs or couples RF signals transmitted from the transmitter 230 on the first communication channel 210 to the first incident path 175. The L-shaped portion of the first coupler 220 closest to the transmit antenna 200 directs or couples RF signals reflected from the transmit antenna 200 to the first reflected path 176.

In the second coupler 320, the L-shaped portion closest to the first receiver 330 directs or couples RF signals transmitted from the mobile 120 on the second incident path 173 to the second communication channel 310. The L-shaped portion of the second coupler 320 closest to the first receive antenna 300 directs or couples RF signals transmitted from the mobile 120 on the second reflected path 174 to the second communication channel 310. The third coupler 420 functions in the same manner as the second coupler 320, but with respect to the second receiver 430 and the third communication channel 410.

As indicated by broken lines, the controller 100 may be included in or be external from the test unit 110. The controller 100 may be a part of the base station 500, or MSC (Mobile Switching Center) connected to the base station 500. The controller 100 may be any type of processor, server or other type of device known to those skilled in the art which is capable of functioning as described herein. The controller 100 may also include any type of hardware, software, application or program known to those skilled in the art capable of executing such functions.

Figure 2:
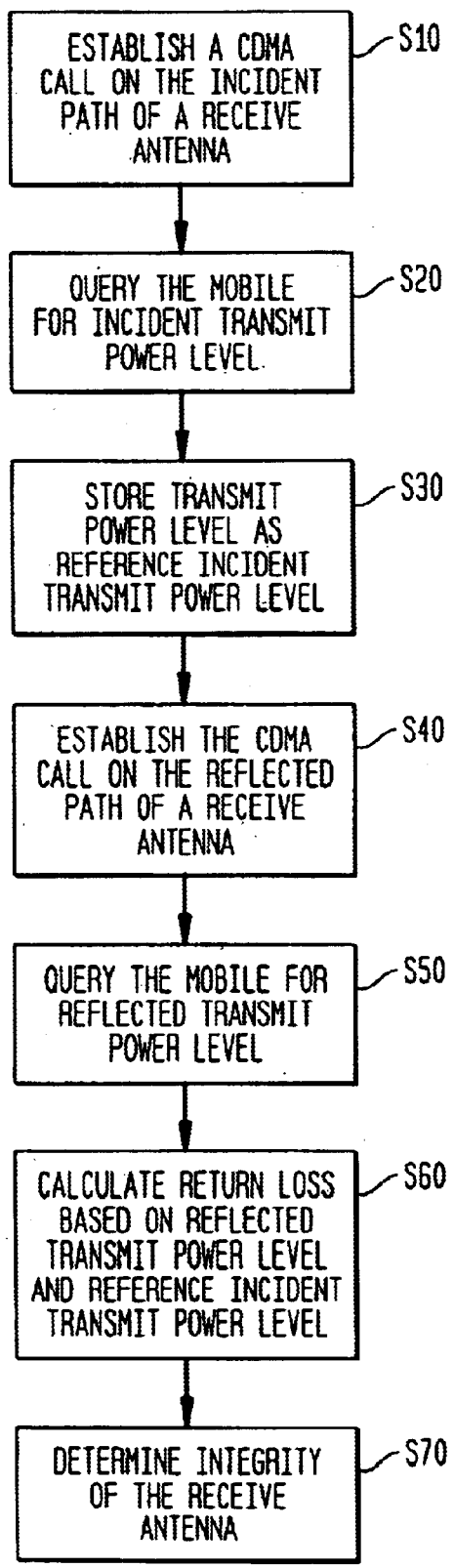
FIG. 2 illustrates a method of conducting a diagnostic return loss test according to one embodiment of the present invention.

The operation of the present invention will be described below with reference to FIG. 2. Because the return loss test is performed the same for both the first receive antenna 300 and the second receive antenna 400 in a simplex cell system, only testing of the first receive antenna 300 is described.

To initiate the diagnostic return loss test of the first receive antenna 300, the controller 100 instructs the mobile 120 in the test unit 110 to establish a standard CDMA call. The controller 100 also instructs the switch matrix 130 to direct the standard CDMA call on the second incident path 173 and instructs the switch matrix 130 to supply signals coupled onto the first incident path 175. In response, the mobile 120 sets up a standard CDMA call by transmitting RF signals on the second incident path 173 to the first receiver 330. In response, the transmitter 230 sends information back to the mobile 120 on the first incident path 175. The information sent by the transmitter 230 may include closed loop power control commands instructing the mobile 120 to adjust the mobile transmit power level, i.e., the power level of the RF signal being transmitted over the second incident path 173.

In the CDMA environment, all mobiles within a cell are controlled according to closed loop power control. That is, the RF power level transmitted by all mobiles must be in accordance with an acceptable SNR (Signal-to-Noise Ratio). The acceptable SNR is a function of the cell system and is based on the bit error rate (BER). If the RF power level transmitted by the mobile 120 is above the acceptable SNR, the transmitter 230 instructs the mobile 120 to lower its transmit power level, i.e., sends a "down" command. If the RF power level transmitted by the mobile 120 is below the acceptable SNR, the transmitter 230 instructs the mobile 120 to increase its transmit power level, i.e., sends an "up" command. This process continues while calls are set up and dropped to control the transmit powers of all the mobiles in a cell. Because closed loop transmit power control is performed for mobiles in communication with the base station 500, closed loop transmit power control is performed for the mobile 120 of the test unit 110.

Eventually, the transmit power of the mobile 120 will achieve the acceptable SNR and the CDMA call will establish and stabilize (S10). The stabilization interval, i.e., the time taken to maintain the acceptable SNR depends on the value of the acceptable SNR and the initial transmit power level of the mobile 120 on the second incident path 173. When the CDMA call is established and stabilized, the transmitter 230 will send a steady transmission of alternating up-down commands on the first incident path 175 to the mobile.

After the stabilization interval, i.e., once the CDMA call is set up and stabilized, the controller 100 queries the mobile 120 for its transmit power level (S20). The measurement is supplied by the mobile 120 over the first data channel 140 between the controller 100 and the mobile 120. The transmit power level transmitted to the controller 100 is then stored as a reference incident transmit power level (S30). The reference incident transmit power level may be stored in the controller 100.

After the reference incident power level is stored, the controller 100 commands the switch matrix 130 to direct the established CDMA call on the second reflected path 174 (S40). The controller 100 also commands the switch matrix 130 to maintain communication with the transmitter 230 on the first incident path 175 and commands the mobile 120 to maintain the established CDMA call.

In response to the controller 100, the mobile 120 transmits the CDMA call, i.e., RF signals on the second reflected path 174. The RF energy is carried on the second reflected path 174 and directed toward the first received antenna 300 by the second coupler 320. If the first receive antenna 300 is an ideal antenna, all RF energy will be transmitted. However, if the first receive antenna 300 is not ideal, which is the case in actuality, some RF energy will be transmitted by the first receive antenna 300 and some RF energy will be reflected back toward the first receiver 330. The amount of reflected RF energy depends on the integrity of the first receive antenna 300. Namely, if the first receive antenna 300 is functioning properly, very little RF energy is reflected to the first receiver 330.

Because the transmitter 230 remains in communication with the mobile 120 on the first incident path 175, closed loop transmit power control continues. Therefore, if zero or very little energy is reflected to the first receiver 330, the transmitter 230 will inform the mobile 120 that transmission at the current transmit power level is insufficient and send "up" commands on the first incident path 175 instructing the mobile 120 to increase its transmit power level. In response, the mobile 120 begins to increase its transmit power level accordingly until a maximum value is reached. As described above, the transmitter 230 transmits "up" commands as long as the transmit power level of the mobile 120 is below the acceptable SNR.

In the case of an ideal first receive antenna 300, the mobile 120 will never be able to increase its transmit power such that the reflected RF energy reaches the acceptable SNR. Accordingly, for an ideal first receive antenna 300, the mobile 120 would reach its maximum before the transmitter 230 stops sending "up" commands. Therefore, the controller 100 would command the mobile 120 to drop the CDMA call if the mobile 120 reaches its maximum transmit power level. Alternatively, the controller 100 may instruct the mobile 120 to drop the call if the mobile 120 has been instructed to increase its power for a certain period of time. In either case, it can be determined that the integrity of the first receive antenna 300 is intact.

In the case of an imperfect first receive antenna 300, the mobile 120 will eventually transmit at a power level such that the reflected RF energy reaches the acceptable SNR. When this occurs, the CDMA call on the second reflected path 174 will establish and stabilize. This second stabilization interval again depends on the value of the acceptable SNR and the transmit power level of the mobile 120 when switched to the second reflected path 174. When the CDMA call is established and stabilized on the second reflected path 174, the transmitter 230 will send a steady transmission of alternating up-down commands on the first incident path 175 to the mobile 120.

After the second stabilization interval, the controller 100 again queries the mobile 120 for its transmit power level, as described above (S50). The transmit power level transmitted to the controller 100 is then stored as the reflected transmit power level.

When the reference incident transmit level and the reflected transmit power level have been determined, the controller 100 calculates the return loss of the first receive antenna 300 based on the difference between the reflected transmit power level and the reference incident transmit power level (S60). The return loss will typically be expressed in dB.

If the return loss is high, the controller 100 determines that the integrity of the first receive antenna 300 is acceptable (S70). That is, if the first receive antenna 300 is functioning properly, a large increase in transmit power is required for the reflected RF energy to reach the acceptable SNR. If the first receive antenna 300 is poor, e.g., a cable is broken, all RF energy is reflected back to the first receiver 300, except for some minor losses in the cable. Very little or zero increase in transmit power indicates a problem with the integrity of the first receive antenna 300.

For example, if the mobile 120 is required to transmit at a power level of −40 dBm to establish a CDMA call on the second incident path 173, but must transmit at its maximum of +23 dBm when switched to the second reflected path 174, the return loss is over 60 dB. This indicates that the first receive antenna 300 is a very good antenna. On the other hand, if the transmit power does not change between the second incident path 173 and the second reflected path 174, this would indicate a problem with the integrity of the first receive antenna 300.

Although the detected amount of return loss of the first receive antenna 300 alone can be used to determine the integrity of the first receive antenna 300, a threshold for pass/fail can be set in the diagnostic return loss test. That is, the first receive antenna 300 will fail the diagnostic return loss test if the calculated return loss does not exceed a threshold value. The threshold value may have a value of 13 dB, for example. If the first receive antenna 300 fails the diagnostic return loss test, it can be determined that the integrity of the first receive antenna 300 is unacceptable and that repair or replacement is required.

In one preferred embodiment of the present invention, the diagnostic return loss test is implemented such that the volume of the calls carried in a cell is taken into consideration. In a heavily loaded cell, where calls are originating and terminating constantly, the transmitter 230 is continuously sending commands to the all mobiles because the SNR of the cell changes as call volume changes. That is, every time a mobile originates a new call in the cell, all other mobiles in the cell experience additional noise, i.e., an increase in SNR. Therefore, the transmitter 230 commands all other mobiles in the cell to increase their transmit power level in accordance with the increased SNR whenever a new call originates. On the other hand, whenever a call is dropped from the cell, all the remaining mobiles experience less noise, i.e., a decrease in SNR. Therefore, the transmitter 230 commands all other mobiles to decrease their transmit power levels in accordance with the decreased SNR whenever a call is dropped from the cell.

This continuous origination and termination of calls is occurring while the diagnostic return loss test is being performed and affects the mobile 120 of the test unit 110. As such, the return loss calculated by the controller 100 may not accurately reflect the integrity of the first receive antenna 300 if the changing volume of calls in the cell between the time that the reference incident transmit power level is stored and the time that the reflected transmit power level is determined is not taken into consideration.

In order to alleviate the effects of changing call volume in the cell, averaging of the reference incident transmit power level and reflected transmit power level is performed in order to approximate simultaneous measurement of the reference incident transmit power level and reflected transmit power level. Such averaging improves the stability of the measurements of the transmit power levels received from the mobile 120. To perform such averaging the CDMA call is switched back and forth between the second incident path 173 and the second reflective path 174 a predetermined number of times, at a known rate, so that excursions in measured transmit power levels may be analyzed for coherency. Using this approach, the affects of a slowly varying receive interference level can be rejected. Thus, the calculated return loss will be a better indicator of the integrity of the first receive antenna 300 when averaging is performed.

To implement this approach, the controller 100 may include software for performing intelligent switching of the established CDMA call between the second incident path 173 and the second reflective path 174. The controller 100 is therefore able to average the measurement of each of the incident transmit power level and reflected transmit power level over a predetermined time interval. Because testing time should not be excessive, such predetermined time interval will typically be on the order of several seconds.

In the present invention, there is also a built in advantage to using the second incident path 173 and the second reflected path 174 to perform the diagnostic return loss test for the first receive antenna 300. In both of the second incident path 173 and the second reflected path 174 there is some degree of signal attenuation. According to one embodiment of the present invention, less path loss is built into the second reflected path 174 by attenuators (not shown) so that there is less signal attenuation in the second reflected path 174 than in the second incident path 173. The controller 100, therefore, assumes that even if the first receive antenna 300 is functioning properly, there will be a certain amount of loss. As such, if the cable is broken and virtually all RF energy is reflected to the first receiver 300, the transmitter 230 will command the mobile 120 to transmit less power due to the lower signal attenuation built into the second reflected path 174. In such a case, the return loss will have a negative value which would clearly indicate that the first receive antenna 300 is not functioning properly.

Alternatively, if a threshold value for pass/fail is to be used in the diagnostic return loss test, the difference in path loss between the second incident path 173 and the second reflected path 174 may be taken into consideration when determining whether the calculated return loss exceeds the threshold value.

The present invention also may include a limiting mechanism via the second coupler 320. If the second coupler 320 is not ideal, all the RF energy carried on the second reflected path 174 will not be directed to direction of the first receive antenna 300. That is, there will always be some RF energy leaking from the second reflected path 174 toward the first receiver 330. As such, the mobile 120 will be required to increase its transmit power level less in order for the reflected RF energy to reach the acceptable SNR of the cell and to establish the CDMA call. Again, in establishing the return loss threshold, such leakage conditions can be taken into consideration.

Although, the invention has been described above in connection with the first receive antenna 300 in a simplex cell, the diagnostic return loss test of the present invention is equally applicable to other receive antennas and other cell systems, such as a duplex cell system.

What is claimed is:

1. A diagnostic return loss test, comprising:

establishing a CDMA call from a test mobile to a receiver associated with a receive antenna via a first communication path, said first communication path between said test mobile to said receiver not including an antenna associated with said receiver;

first measuring a transmit power level of said test mobile to establish said CDMA call;

switching from said first communication path between said test mobile and said receiver to a second communication path, said second communication path having lower signal attenuation than said first communication path, and said second communication path including said antenna associated with said receiver such that signals sent from said test mobile are received by said receiver after reflecting from said antenna;

increasing said transmit power level of said test mobile until said receiver recognizes said CDMA call;

second measuring said transmit power level of said test mobile when said receiver recognizes said CDMA call or when a maximum transmit power level is reached; and first determining a return loss of said antenna based on said first and second measured transmit power levels.

2. The method according to claim 1, wherein said increasing step increments said transmit power level of said mobile under closed loop power control.

3. The method according to claim 1, further comprising:

second determining an integrity said antenna from said determined return loss.

4. The method according to claim 3, wherein said second determining step determines said integrity of said antenna is acceptable if said return loss exceeds a threshold value.

5. The method according to claim 4, wherein said threshold value is 13 dB.

6. The method according to claim 1, wherein said first determining step determines said return loss by taking a difference between said second measured transmit power level and said first transmit power level.

7. A diagnostic return loss test comprising:

determining a return loss of a receive antenna based on an incident transmit power level of a test mobile required to establish a CDMA call on an incident path of said receive antenna and one of a reflected transmit power level of said test mobile required to establish said CDMA call on a reflected path of said receive antenna and a maximum transmit power level of said test mobile, said reflected path having lower signal attenuation than said incident path;

increasing a transmit power level at said test mobile from said incident transmit power level to establish said CDMA call on said reflected path; and determining said return loss based on said incident transmit power level and said maximum transmit power level when said increasing step increases said transmit power level to said maximum power level and said CDMA call has not been established on said reflected path.

8. The method according to claim 7, wherein said determining step determines said return loss as a difference between said reflected transmit power level and said incident transmit power level.

9. The method according to claim 7, wherein said determining step determines said return loss as a difference between said maximum transmit power level and said incident transmit power level.

* * * * *